United States Patent [19]

Pearson

[11] Patent Number: 5,135,277
[45] Date of Patent: Aug. 4, 1992

[54] WORK STATIONS

[75] Inventor: Graeme L. S. Pearson, Kellyville, Australia

[73] Assignee: M.M. Jack Engineering Pty. Limited, Kellyville, Australia

[21] Appl. No.: 602,285

[22] Filed: Nov. 14, 1990

[30] Foreign Application Priority Data

Jun. 10, 1988 [AU] Australia .................... PI8745

[51] Int. Cl.$^5$ ............................ B60R 13/00
[52] U.S. Cl. .................... 296/21; 211/198; 211/50; 211/94; 296/24.1
[58] Field of Search .............. 296/21, 24.1; 211/71, 211/135, 55, 198, 50, 94

[56] References Cited

U.S. PATENT DOCUMENTS

| | | | |
|---|---|---|---|
| 1,473,850 | 11/1923 | Greene | 296/24.1 |
| 1,940,877 | 12/1933 | Ochse | 211/79 |
| 2,916,293 | 12/1959 | Lang | 296/21 |
| 4,480,866 | 11/1984 | Komatsu | 296/21 |
| 4,981,318 | 1/1991 | Doane et al. | 296/24.1 |

FOREIGN PATENT DOCUMENTS 509671 10/1930 Fed. Rep. of Germany ........ 296/21

Primary Examiner—Robert R. Song
Attorney, Agent, or Firm—Abelman Frayne & Schwab

[57] ABSTRACT

A work station for use with a vehicle has one or more inclined support frames of triangular construction, each frame receiving at least one slidably mounted carriage frame which can slide on the inclined support frame from a first position to a second position, thus allowing the carriage frame to slide from a first position to a second position in a direction which is downward and away from the first position, but which maintains the carriage frame substantially parallel to the inclined support frame, the inclined support frame allowing the carriage frame to slide from the second position to the first position in a direction upwards and towards the first position.

7 Claims, 4 Drawing Sheets

-A-

-B-

-C-

-D-

-E-

-F-

-G-

-H-

WORK STATIONS

TECHNICAL FIELD

This invention relates to work stations and more particularly to what may be termed "field service vehicles", comprised of a said work station incorporated within an enclosure such as a van body, a trailer body or other like container.

BACKGROUND ART

Commercial motor vehicle bodies for the storage, transport and display of articles of merchandise or goods, services and equipment, and also mobile vending booths are known, for example, U.S. Pat. No. 4,480,866 discloses a van body which has at least one display rack capable of being extended laterally to provide a centre passageway from which an intending purchaser is able to view the goods on display.

U.S. Pat. No. 4,270,319 reveals a similar arrangement, here a van or trailer body has lateral "pull-out" extensions to accommodate buyers under cover, while the main body portion is able to accommodate such as cooking equipment, bains-marie and serving counters; thus, it constitutes a superior kind of "hot dog stand".

Somewhat similar arrangements are disclosed in German Patent Specification No.'s 2744839 and 2724137 and in French Patent Specification No. 2748557.

However, such prior art constructions are generally quite complex arrangements, are not very versatile and are often mechanically unstable.

DISCLOSURE OF INVENTION

According to the present invention, the above and other disadvantages are overcome by the provision of a work station which is optionally accommodatable within an enclosure, the work station comprising one or more inclined support frames each adapted to have slideably mounted thereon at least one co-operating carriage frame capable of being slidably moved, on its associated support frame, outwardly and downwardly with respect to the work station; the work station and an enclosure associated with it together constitute a so-called "field service vehicle".

Ideally, the enclosure may well be, say, a transportable van body or trailer body, or other like container.

The or each co-operating carriage frame has, most advantageously, on it, or within it, or at least associated with it, a "designated-purpose structure"—as will be defined hereinafter.

Moreover, the or each co-operating carriage frame is preferably provided with means for raising and lowering it and for adjusting its position relative to its associated support frame.

BRIEF DESCRIPTION OF THE DRAWINGS

In order that the reader may gain a better understanding of the present invention, hereinafter will be described certain preferred embodiments thereof, by way of example only and with reference to the accompanying drawings in which.

DESCRIPTION OF THE PREFERRED EMBODIMENTS

Figure 1:
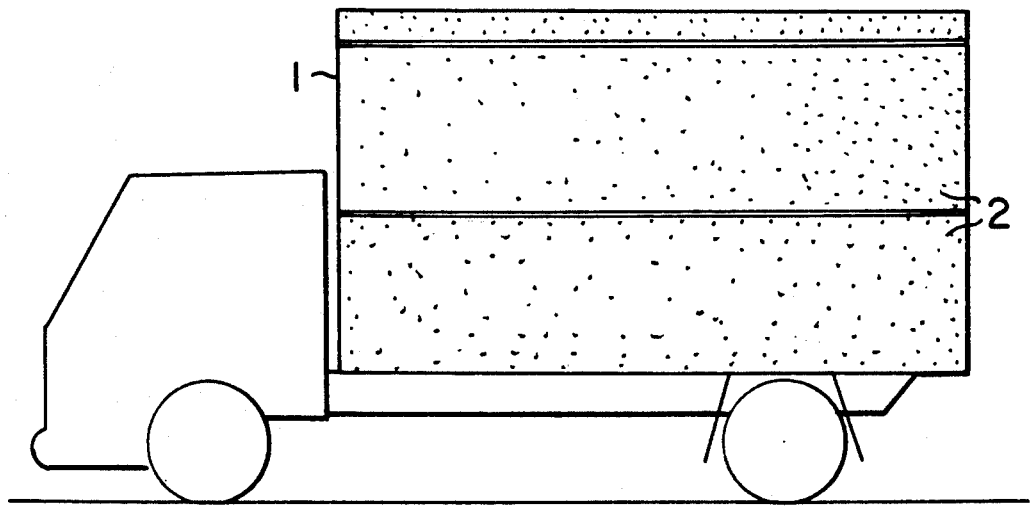
FIG. 1 is a somewhat schematic side elevation of a field service vehicle of the kind which constitutes an enclosure together with an inventive work station.
Figure 2:
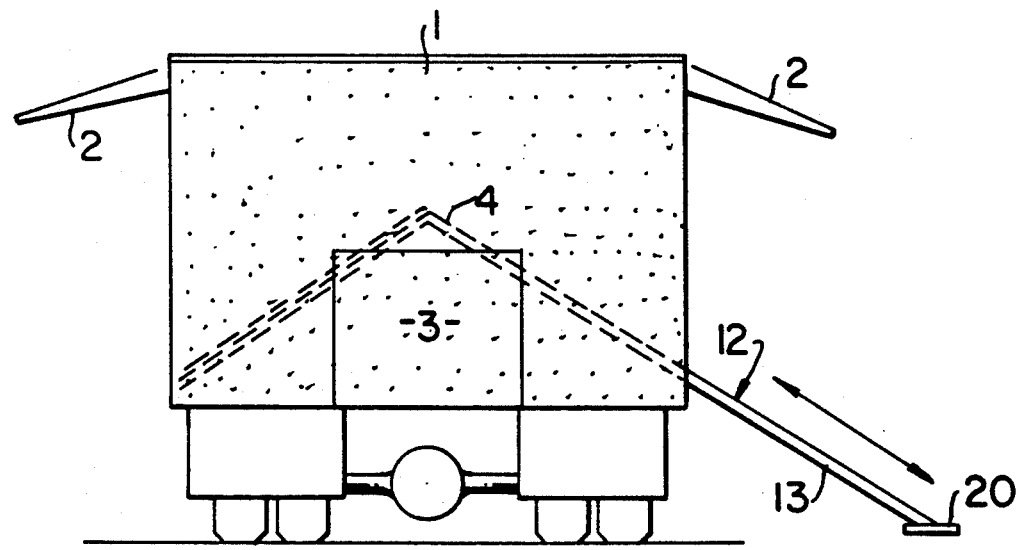
FIG. 2 is a corresponding rear elevation.

In FIGS. 1 and 2 is to be seen a field service vehicle including a van body 1 which constitutes an enclosure adapted to accommodate therewithin an inventive work station. However, although in this particular embodiment the work station is installed within a van body, it is to be clearly understood that it might equally well be accommodated in a trailer body, a discrete "container", or the like. While this work station concept is ideally enclosed within a transportable body which can be removeably fitted on the tray of a trailer, or of a motor vehicle, or even onto a railway flat car, it is envisaged that the work station could just as well be permanently affixed to a base, or plinth, or the like. In fact the inventive work station is extremely versatile and a canopy body is not essential to its functioning, as will be realised. The overall outside dimensions of the work station, or at least of the enclosure, are limited only by local road or rail usage regulations. As is best to be seen in FIG. 2, van body 1 has hinged side doors 2 which are able to be folded upwardly to provide access to the work station within. Additionally, there may be one or more end doors or hatches, as that referenced 3 in FIGS. 2 and 8. Nevertheless, access arrangements are not limited to folding doors, alternatively "barn" doors, roller doors, or even curtains may be employed.

Figure 3:
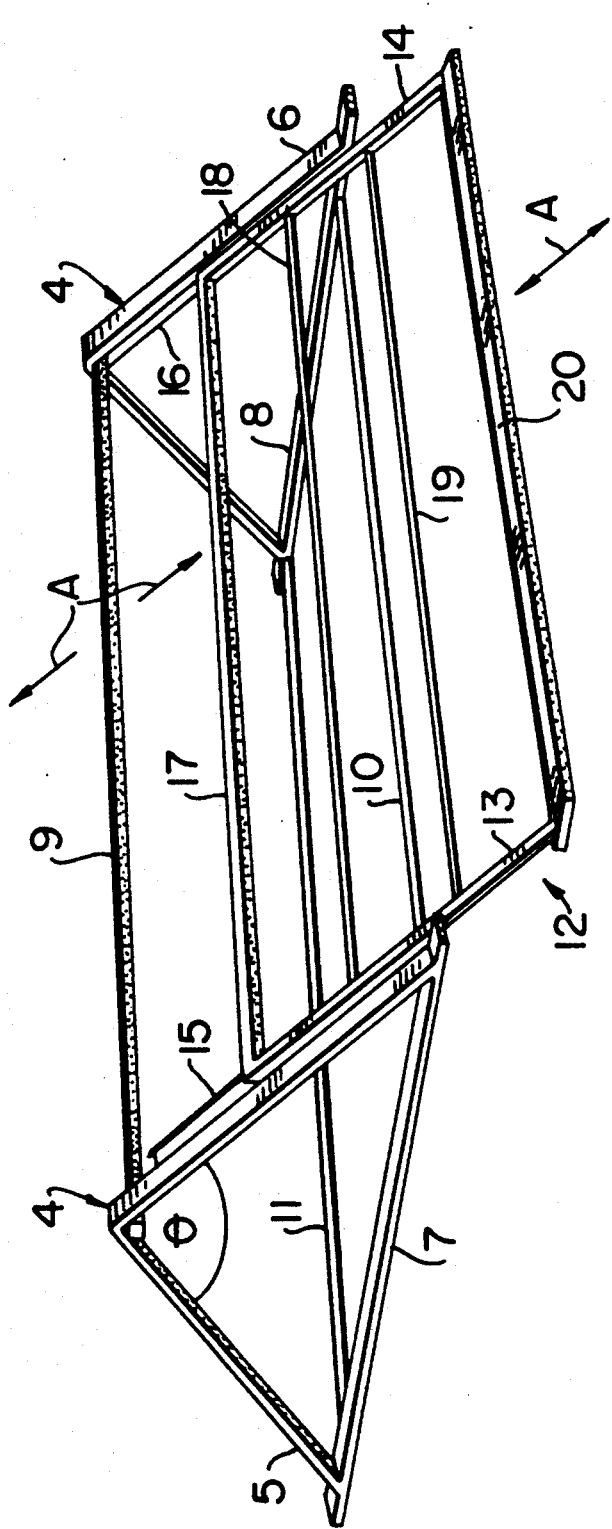
FIG. 3 is a perspective view of one preferred embodiment of an inventive work station's component parts.

Within body 1 may be installed the inventive work station, comprising, among other components better to be seen in the FIG. 3 perspective drawing, one or more inclined support frames 4 shown in end view and in broken line.

Illustrated in FIG. 3 is a dual-sided work station in which support frame 4 includes a pair of triangular end members 5 and 6, the lower limbs 7 and 8 of which are affixed, as by such as bolting down, or more permanently fastened, to the floor of the enclosure. End members 5 and 6 are connected together by three bars or rods 9, 10 and 11; in a modification, the end members themselves may be affixed to the walls of an enclosure and top bar 9 done away with. In certain applications removal of bar 9 is of advantage.

The angle may be varied in accordance with individual requirement and is limited only by the need to clear cab and chassis components disposed below chassis level. While FIG. 3 shows a dual-sided work station adapted to be accommodated within such as the van body shown in FIGS. 1 and 2, any other geometry of support frame 4 which is feasible is contemplated; for example, single sided, or a portion only of a side, or having rear access, etc.,—see the selection of possible configurations shown in the FIG. 8 composite drawing.

The or each support frame 4 is adapted to have slidably mounted thereon at least one co-operating carriage frame as that referenced 12 of such a geometry as to fit within support frame 4 and to be slideably moveable thereon for outward and downward movement—as indicated by the double arrows A—with respect to the work station. Such movement of carriage frame 12 may be loosely be termed a "diagonal" movement, although only in certain instances will it represent a true diagonal with respect to the enclosure's cross-section.

As has been previously indicated, the embodiment of support frame 4 shown in FIG. 3 will usually have a second carriage frame on the opposite side of support frame 4. Side members 13 and 14 of carriage frame 12 may be provided with such as ball bearings, roller bearings, wheels, etc., adapted to run in channels or on rails, as indicated at 15, 16. Carriage frame 12 also includes a top frame member 17, preferably one or more intermediate frame members as 18 and 19 and a bottom rail or running board 20. The carriage frame rolling system components are widely variable in design and construction as required or desired.

The or each co-operating carriage frame 12 is provided with means for raising and lowering it and for adjusting its position relative to its associated support frame 4. Mechanisms envisaged include:

1) hydraulics combined with cables and pulleys;
2) direct-acting hydraulics;
3) manually-operated winches and differential pulleys;
4) mechanical winches;
5) mechanically-assisted rack-and-pinion arrangements;
6) chain-and-sprocket arrangements—manual or mechanically-assisted
7) pneumatics In fact, any motive power which will move a load through a given distance is suitable as a lifting and height-adjusting mechanism.

Figure 4:
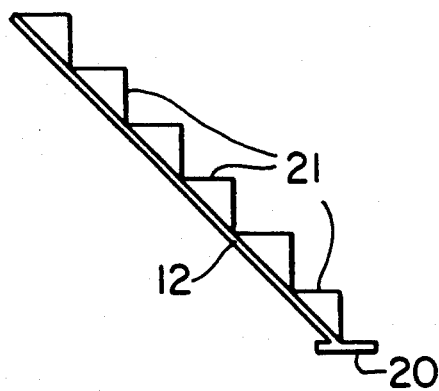
FIGS. 4 to 7 schematically illustrate some examples of the various usages to which the inventive work station may be put.
Figure 5:
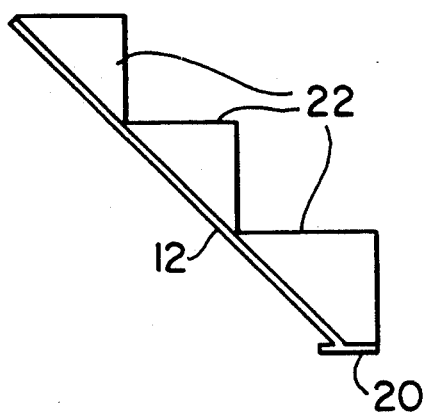
Figure 6:
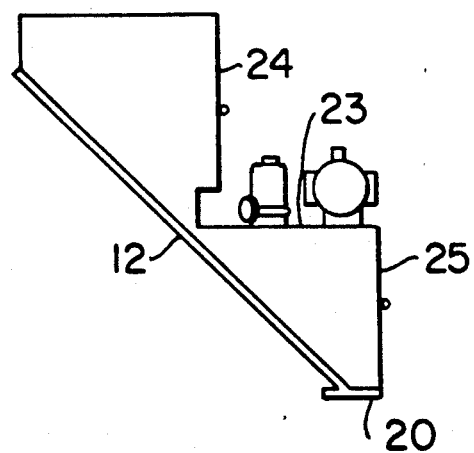
Figure 7:
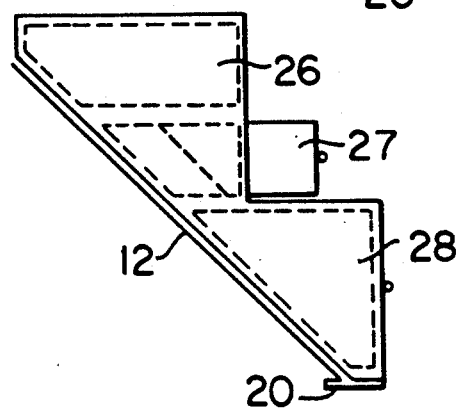

The carriage frame 12 functions as an inclined platform for the reception upon it, or within it, of a designated-purpose structure, some graphic examples being schematically shown in FIGS. 4 to 7. Specifically, FIG. 4 shows an array of small shelves 21 which may be of metal grid or mesh, solid metal or any other suitable material. FIG. 5 illustrates similar but larger shelving 22. FIG. 6 shows a workbench 23 with cupboards 24 and 25, over and under respectively, while FIG. 7 shows a storage facility including pigeonholes as 26, drawers as 27, and cupboards as 28.

Other uses are numerous—racks, shelves etc., for displaying product, articles of merchandise or other goods, services, etc.; benches or tabletops for ease of performance of manual operations and/or demonstrations; arrays of drawers, pigeonholes and/or storage bins and hoppers; frames and stands for trade tools and equipment; and many more. Potential users may well be such as sales and display organizations, authorities such as Telecom, County and Municipal Councils, Waterboards, etc. etc.; and tradesmen as, for example, nurserymen, plumbers, electricians, painters and decorators, and so on.

Figure 8:
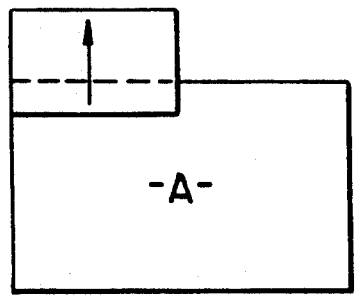
FIGS. 8(A–H) are composite drawing showing a selection of possible configurations.
Figure 8:
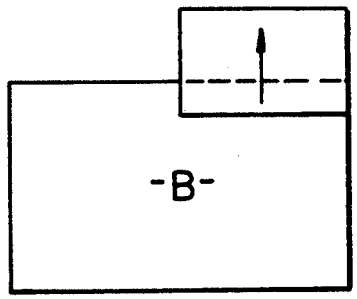
Figure 8:
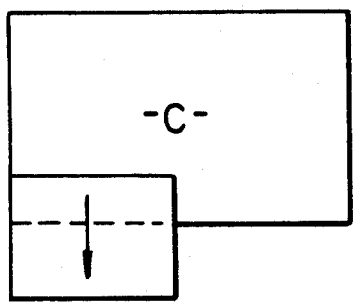
Figure 8:
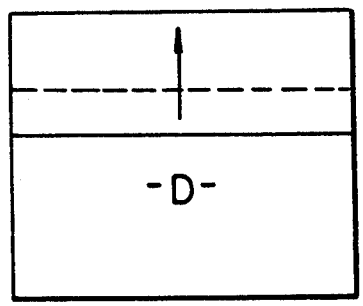
Figure 8:
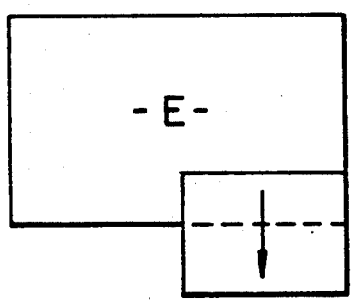
Figure 8:
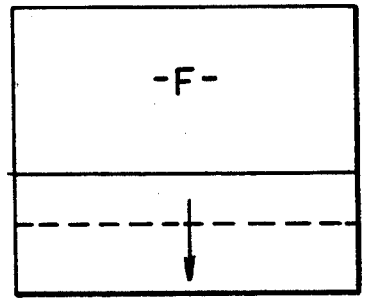
Figure 8:
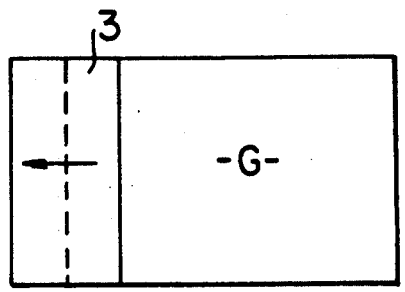
Figure 8:
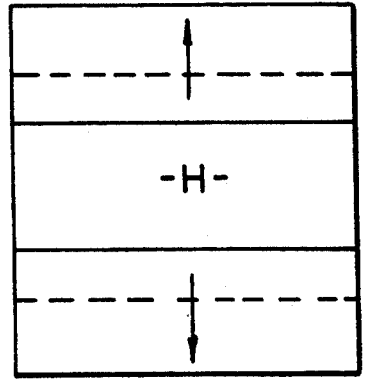

FIG. 8 shows, diagrammatically, some of the various layouts contemplated. A work station may have a support frame which occupies, say, one quarter, or other portion of the floor-space as in A, B, C and E, either at front or rear end and at either side; a single full-length support frame as in D and F; double full-length frame as in H; and the previously-mentioned rearwardly-disposed support frame as in G.

Mobile service/vending/maintenance and display vehicles are currently, with few exceptions, of a walk-in, centre aisle design; this means that space must be allowed for the movement of personnel in the body of the vehicle to gain access to tools, products, etc. This space may well occupy up to one half the body volume, but seldom less than one third. The present invention permits transfer of pedestrian space required to the outside of the vehicle and thus reduces the required volume of body space while maintaining the original storage capacity. The possible reduction in body size will, in many instances, allow reduction on overall size.

Other advantages ensue from the inventive work station, such as:

(a) up to 50% reduction in body size;
(b) greater access to and visual exposure of stored products;
(c) potential reduction inoverall vehicle dimensions and thus power;
(d) work station transferrable from vehicle to vehicle;
(e) the arrangement can be "containerised" for semi-permanent or permanent field use; and
(f) in the majority of cases, considering like vehicles, reduction in gross vehicle weight results because of the smaller body.

From the abovegoing, it will be readily appreciated by those skilled in the art that numerous variations and modifications may be made to the invention without departing from the spirit and scope thereof as set out in the following claims.

I claim:

1. A work station for use with a vehicle, said work station comprising one or more inclined support frames of a triangular construction; each frame receiving at least one slidably mounted carriage frame which slides on said inclined support frame from a first position to a second position; said inclined support frame allowing said carriage frame to slide from said first position to said second position in a direction which is downward and away from said first position but maintains said carriage frame substantially parallel to said inclined support frame; said inclined support frame allowing said carriage frame to slide from said second position to said first position in a direction upwards and towards said first position.

2. The work station as claimed in claim 1, wherein said work station is enclosed by a walled structure.

3. The work station as claimed in claim 1, wherein said work station is constructed as part of a vehicle.

4. The work station as claimed in claim 1, wherein said work station is constructed as part of a transportable van body, trailer body, truck body or like vehicle.

5. The work station as claimed in claim 1, wherein said carriage frame includes any one of or a combination of the following: shelves, work benches, storage facilities; drawers, pigeonholes; cupboards; racks, table tops, storage bins; hoppers; stands and frames.

6. The work station as claimed in claim 1, wherein said carriage frame is provided with at least one lowering and raising mechanism.

7. The work station as claimed in claim 6, wherein said mechanism includes any one of the following: hydraulics combined with cables and pulleys; direct cutting hydraulics; manually operated winches and pulleys; mechanically operated winches; rack and pinion arrangements, chain and sprocket arrangement and pneumatics.

* * * * *